(12) United States Patent
Piaulet et al.

(10) Patent No.: US 8,954,239 B2
(45) Date of Patent: Feb. 10, 2015

(54) DEVICE AND METHOD FOR CONTROLLING A SEAT ACTUATOR IN A VEHICLE SUCH AS AN AIRCRAFT

(75) Inventors: Jean-Francois Piaulet, Deols (FR); Christophe Bordichon, Le Pechereau (FR)

(73) Assignee: PGA Electronic, Montierchaume (FR)

( * ) Notice: Subject to any disclaimer, the term of this patent is extended or adjusted under 35 U.S.C. 154(b) by 0 days.

(21) Appl. No.: 14/005,252

(22) PCT Filed: Mar. 14, 2012

(86) PCT No.: PCT/EP2012/054448
§ 371 (c)(1),
(2), (4) Date: Sep. 13, 2013

(87) PCT Pub. No.: WO2012/123487
PCT Pub. Date: Sep. 20, 2012

(65) Prior Publication Data
US 2014/0001802 A1    Jan. 2, 2014

(30) Foreign Application Priority Data
Mar. 15, 2011 (FR) ...................... 11 52119

(51) Int. Cl.
*B60N 2/00* (2006.01)
*B60N 2/02* (2006.01)
*B64D 11/06* (2006.01)
*B60N 2/44* (2006.01)

(52) U.S. Cl.
CPC *B60N 2/02* (2013.01); *B60N 2/002* (2013.01); *B60N 2/0232* (2013.01); *B60N 2/0244* (2013.01); *B64D 11/06* (2013.01); *B64D 2011/0606* (2013.01); *B64D 2011/0634* (2013.01); *B64D 2011/0648* (2013.01); *B60N 2002/0268* (2013.01); *B60N 2002/445* (2013.01)
USPC ........................................... 701/49

(58) Field of Classification Search
USPC ........................................... 701/49
See application file for complete search history.

(56) References Cited

U.S. PATENT DOCUMENTS

| | | | |
|---|---|---|---|
| 4,907,153 A | 3/1990 | Brodsky | |
| 6,526,643 B1 * | 3/2003 | Renault | 29/407.05 |
| 6,949,904 B2 * | 9/2005 | Rumney | 318/565 |
| 2003/0080699 A1 * | 5/2003 | Rumney | 318/9 |
| 2006/0241836 A1 | 10/2006 | Kachouh et al. | |

FOREIGN PATENT DOCUMENTS

| | | | |
|---|---|---|---|
| EP | 1 228 963 A1 | 8/2002 | |
| FR | 2 806 674 A1 | 9/2001 | |
| GB | 2 383 265 A | 6/2003 | |

OTHER PUBLICATIONS

PCT International Search Report in International Application No. PCT/EP2012/054448, mailed on May 14, 2012.

* cited by examiner

*Primary Examiner* — Mary Cheung
*Assistant Examiner* — Anne Mazzara
(74) *Attorney, Agent, or Firm* — Nixon Peabody LLP

(57) ABSTRACT

The invention relates to a control device for controlling an actuator for moving a mobile element of a seat in a vehicle. The control device comprises: a measuring device for determining a reference parameter relating to a passenger in the seat and/or to the state of the vehicle, and power-limiting means for defining a maximum limit for the power generated by the actuator in accordance with said parameter. The invention further relates to a seat or aircraft comprising the aforementioned device, and to a control method using said device.

10 Claims, 1 Drawing Sheet

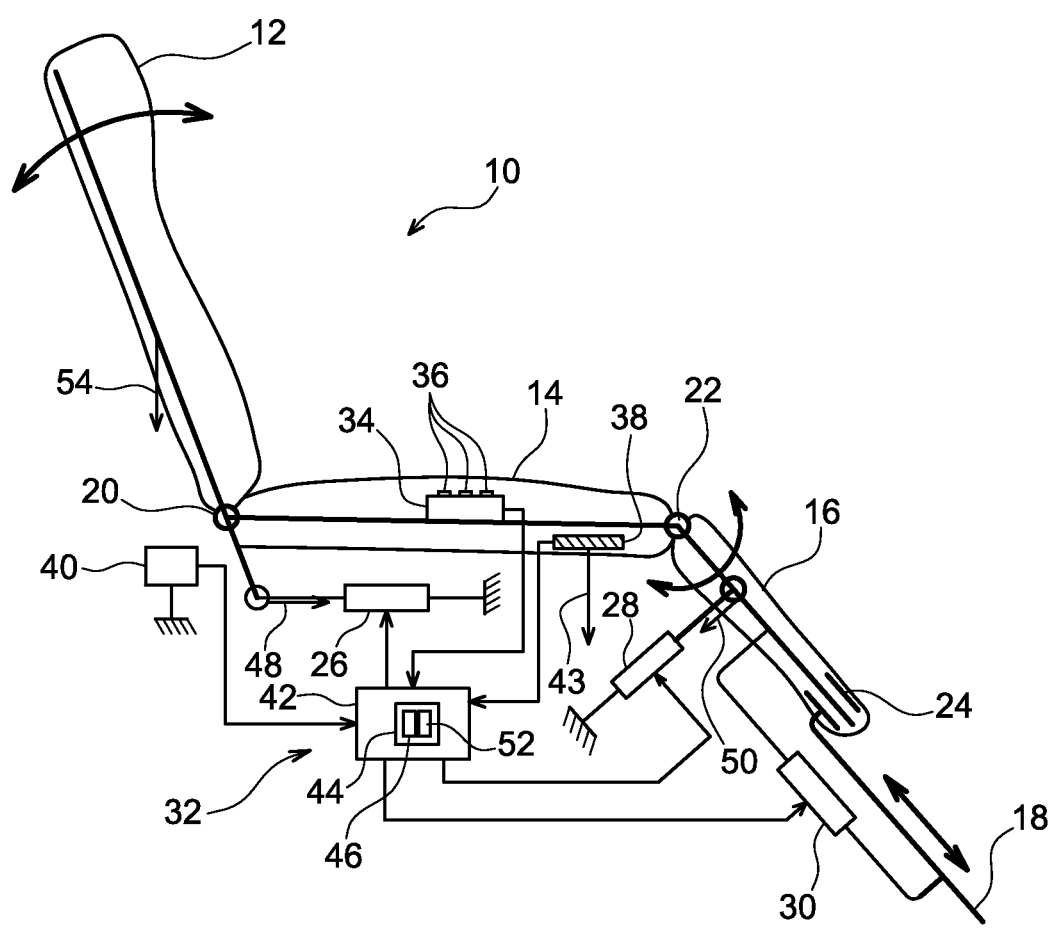

DEVICE AND METHOD FOR CONTROLLING A SEAT ACTUATOR IN A VEHICLE SUCH AS AN AIRCRAFT

CROSS REFERENCE TO RELATED APPLICATIONS

This application is the national stage of International Application No. PCT/EP2012/054448, filed Mar. 14, 2012, entitled, "Device And Method For Controlling A Seat Actuator In a Vehicle Such As An Aircraft," which claims the benefit of priority of French Patent Application No. 11 52119, filed Mar. 15, 2011, the contents of both of which are incorporated herein by reference in their entirety.

TECHNICAL FIELD

The present invention relates to the control of actuators for adjusting mobile elements of seats with electric adjustment in vehicles, for example in aircraft, but also in automobile vehicles, trains or ships. Such mobile elements may in particular be a back rest, a seat portion, a leg rest, a foot rest, an arm rest or a head rest.

The invention relates in particular to a control device and method for limiting the power generated by an actuator of this type to enable a manoeuvre of the actuator in optimal conditions of comfort and safety.

PRIOR ART

The seats with electric adjustment that equip certain vehicles, particularly certain aircraft, are normally provided with means for limiting the power generated by the actuator(s) enabling the adjustment of said seats in order to reduce the risks of injury of passengers while maneuvering said seats.

In fact, a too high power of these actuators can pose a risk for the safety of passengers installed in these seats, in particular in the event of error in manipulating the controls for adjusting the seats which could lead to pinching of passengers.

Hence, the power of the actuators is in general limited to a predetermined maximum limit value so as to guarantee conditions of safety but also of comfort to passengers while maneuvering the seats.

Nevertheless, although this power limit value may be suitable for passengers of average corpulence, the applicant has noted that this limit value can prove to be inadequate in the event of a passenger of unusual corpulence and/or in the event of tilt of the vehicle.

In fact, the power limit value may then prove too low in which case seat maneuvers risk being impossible, or this limit value may on the other hand be too high in which case the safety of passengers risks no longer being guaranteed during seat maneuvers.

DESCRIPTION OF THE INVENTION

The aim of the invention is in particular to provide a simple, economic and efficient solution to this problem.

It relates to a device for controlling an actuator for moving a mobile element of a seat in a vehicle, comprising power-limiting means capable of imposing a limit value of the power generated by the actuator, which is appropriate whatever the corpulence of the passenger installed in the seat and/or whatever the state of the vehicle The invention proposes to this end a control device for controlling at least one actuator for moving a mobile element of a seat in a vehicle, comprising a measuring device for determining at least one reference parameter relating to a passenger supported by the seat and/or relating to the state of the vehicle, as well as power-limiting means for defining a maximum limit for the power generated by the actuator in accordance with said reference parameter.

The invention thus makes it possible to adapt in an optimal manner the maximum limit for the power generated by the aforementioned actuator to the level of power effectively required to operate a movement of said mobile element of the seat in good conditions of comfort and safety.

More precisely, the invention makes it possible to minimise the risk that the maximum power of the actuator is too high, and thus the risk of injury during maneuvers of the actuator for the passenger optionally installed in the seat, and the invention makes it possible to minimise the risk that the maximum power of the actuator is too low, and thus the risk of impossibility of maneuvering said mobile element of the seat when a passenger is installed therein.

Obviously, the aforementioned control device may be used to control several actuators provided for the adjustment of a same mobile seat element or several respective mobile elements.

In addition, the mobile element being referred to here may be any type of adjustable element intended to support a part of the body of a passenger installed on the seat. Said mobile element may notably be a back rest, a seat portion, a leg rest, a head rest, an arm rest or a foot rest.

The measuring device comprises preferably tilt measuring means configured so as to measure the tilt of the vehicle with respect to the horizontal direction.

The tilt measuring means make it possible to provide information to the power-limiting means on the tilt of the vehicle and thus enable a better adaptation of the maximum power limit of the actuator determined by said power-limiting means. The tilt of the vehicle has in fact an influence on the manner in which the weight of the passenger optionally installed in the seat is taken up by the different elements making up said seat and thus on the level of effort that the actuator has to exert to succeed in moving the aforementioned mobile element in good conditions.

In a variant or in complementary manner, the measuring device advantageously comprises weight measuring means configured so as to provide information on a component of the weight of the aforementioned passenger being exerted against the actuator.

The weight measuring means make it possible to provide information to the power-limiting means on the corpulence of the passenger optionally installed in the seat and thus enable a consequent adaptation of the maximum power limit generated by the actuator. Thus, this maximum power limit may be raised in the event of a passenger of relatively high corpulence and lowered in the event of a passenger of relatively low corpulence.

The aforementioned weight measuring means are advantageously associated with said actuator so as to enable a direct measurement of the component of the weight of the passenger being exerted against said actuator.

In this case, the weight measuring means directly measure the resistance that the passenger exerts against the maneuvers of the actuator, such that said weight measuring means may be sufficient in themselves to enable the determination of a maximum power limit that is optimal, in which case the presence of a tilt sensor may be superfluous.

In a preferred embodiment of the invention, the aforementioned weight measuring means are configured so as to measure a component of the weight of the passenger being exerted along a predetermined direction against a component of the seat other than said actuator, and the measuring device further comprises tilt measuring means configured so as to measure the tilt of the vehicle with respect to the horizontal direction, the measuring device being configured to provide information on the component of the weight of said passenger being exerted against the actuator from the result of the measurements carried out respectively by the weight measuring means and by the tilt measuring means.

In this case, the measurements supplied respectively by the weight and tilt measuring means are combined so as to obtain a reference parameter representative of the efforts that the passenger places against the actuator. More precisely, the weight measuring means providing information on the corpulence of the passenger, without necessarily providing a measurement of the actual weight of said passenger, and the tilt measuring means provide information on the manner in which the weight of the passenger is exerted against the actuator as explained above.

The invention also relates to a seat for vehicle, comprising at least one mobile element and at least one actuator for moving said mobile element, as well as a control device of the type described above to control said actuator.

The control device described above is in fact advantageously integrated in a vehicle seat. In a variant, said device may equip a vehicle while being structurally independent of one or more seats for which said device assures the control.

The invention further relates to an aircraft, comprising at least one seat comprising at least one mobile element as well as at least one actuator for moving said mobile element, the aircraft comprising a control device of the type described above for controlling said actuator.

As explained above, the control device may be integrated in the aforementioned seat or be structurally independent thereof.

The aforementioned aircraft may be equipped with several control devices of the type described above to assure the control of several seats of said aircraft.

In this case, certain elements of the control devices may be pooled, in other words used jointly by all of these control devices. This is for example advantageously the case as regards a tilt sensor.

The invention also relates to a method for controlling an actuator for moving a mobile element of a seat in a vehicle by means of a control device of the type described above, the method comprising a step of defining a maximum limit for the power generated by said actuator as a function of the reference parameter determined by the measuring device of the control device and relating to a passenger supported by the seat and/or relating to the state of the vehicle.

Said step is preferably repeated at regular intervals during each manoeuvre of the actuator.

Said step may optionally be continuously repeated at regular interval, in other words both during maneuvers of the actuator and when it is at rest.

In a variant, said step may be carried out a single time at the start of each manoeuvre of the actuator.

This may be sufficient to obtain a relevant value of the maximum authorised power limit for the actuator if the vehicle experiences relatively slow tilt variations such that the risk is low that the manner in which the weight of the passenger is exerted against the actuator is modified in a significant manner during a manoeuvre of said actuator.

Said maximum limit for the power generated by the actuator is preferably determined from a comparison between the value of the aforementioned reference parameter and a mapping bringing into relation several ranges of values for said reference parameter with a corresponding number of predetermined maximum power values.

Said mapping comprises for example three ranges of values of the reference parameter, corresponding for the first to a passenger of light corpulence and/or to a tilt of the aircraft such that the seat leans forwards, for the second to a passenger of normal corpulence and to a low or zero tilt of the aircraft, and for the third to a passenger of heavy corpulence and/or to a tilt of the aircraft such that the seat leans backwards, and this mapping then further comprises three power limit values associated respectively with three aforementioned ranges of values of said reference parameter.

In a variant, the mapping may be replaced by a mathematical function bringing into correspondence a continuous range of values of the reference parameter with a continuous range of maximum power values.

BRIEF DESCRIPTION OF DRAWINGS

The invention will be better understood, and other details, advantages and characteristics thereof will become clear on reading the following description given by way of non-limiting example and with reference to the single FIGURE illustrating a seat according to a preferred embodiment of the invention.

DETAILED DESCRIPTION OF PREFERRED EMBODIMENTS

The single FIGURE represents an aircraft seat 10 comprising a back rest 12, a seat portion 14, a leg rest 16 and a foot rest 18.

On this seat 10, the back rest 12 hinges by a movement of rotation around an axis 20 arranged at an edge of the seat portion 14, the leg rest 16 also hinges by a movement of rotation around an axis 22 arranged at an edge of the seat portion 14 opposite the aforementioned edge, and the foot rest 18 can be moved in translation with respect to the leg rest 16, as symbolized by the connection 24.

The seat 10 comprises three actuators 26, 28 and 30, illustrated very schematically in the FIGURE, and for respectively moving the back rest 12 and the leg rest 16 in rotation and for moving the foot rest 18 in translation.

The seat 10 comprises a control device 32 comprising a control panel 34 provided with control buttons 36, a weight sensor 38, a tilt sensor 40, and a control unit 42.

The control panel 34 is for example integral with the seat portion 14 of the seat 10 or a frame of said seat (not visible in the FIGURE).

The weight sensor 38 is for example housed inside the seat portion 14 so as to measure the force 43 exerted on the seat portion 14 by the passenger optionally installed in the seat 10 due to the weight of said passenger.

The tilt sensor 40 and the control unit 42 are for example mounted on the frame of the seat.

In the terminology of the present invention, the weight sensor 38 forms a weight measuring means and the tilt sensor 40 forms a tilt measuring means, all of these sensors forming a measuring device.

The control unit 42 is intended to control the actuators 26, 28 and 30 as a function of the state of the control buttons 36 of the control panel 34. In addition, this control unit 42 integrates power-limiting means, designated symbolically by the reference 44 in the FIGURE, and intended to limit the power generated by the actuators 26 and 28 of the backrest 12 and the leg rest 16 to a limit value as a function of the measurements supplied by the weight sensor 38 and by the tilt sensor 40, so as to guarantee the safety of the passenger optionally installed in the seat 10 during a manoeuvre of these actuators.

In the example represented in the FIGURE, the power of the aforementioned actuators is determined by the intensity of the electric current that supplies them, such that the power-limiting means 44 are configured to limit the intensity of said actuator supply current.

The power-limiting means 44 integrate a calculator 46 configured to determine, from measurements supplied by the weight sensor 38 and by the tilt sensor 40, the value of a reference parameter defined so as to provide information on the value of the two components 48 and 50 of the weight of the passenger that is exerted respectively against two aforementioned actuators 26 and 28.

Generally speaking, the aforementioned reference parameter is thus defined so as to increase, on the one hand when the weight of the passenger increases, and on the other hand when the tilt of the aircraft is such that the force 48, 50 exerted by the passenger against each of the actuators 26 and 28 increases, to be specific when the seat is leaning backwards, and vice-versa. It must be understood here that the seat 10 is leaning forwards when the axis of rotation 20 of the back rest 12 is higher than the axis of rotation 22 of the leg rest, and vice-versa when the seat is leaning backwards.

The power-limiting means 44 further integrate an electronic memory 52 in which is stored a mapping defining a relation between a series of ranges of values for the aforementioned reference parameter on the one hand and a series of corresponding power limit values on the other hand.

This mapping defines for example three ranges of values of the reference parameter, corresponding for the first to a passenger of light corpulence and/or to a tilt of the aircraft such that the seat 10 is leaning forwards, for the second to a passenger of normal corpulence and to a low or zero tilt of the aircraft, and for the third to a passenger of heavy corpulence and/or to a tilt of the aircraft such that the seat 10 is leaning backwards, and this mapping further defines three limit power values associated respectively with the aforementioned three ranges of values of said reference parameter.

The calculator 46 is configured so as to define at regular time intervals a limit value of supply current for the aforementioned two actuators 26 and 28, corresponding to a limit value for the power generated by these actuators which is equal to the power limit value corresponding to the aforementioned range of mapping in which lies the value of the reference parameter established by the calculator as a function of the weight and tilt measurements supplied by the sensors 38 and 40.

In operation, the calculator 46 calculates at regular intervals, preferably at a high frequency of real-time type, the value of the aforementioned reference parameter from the weight measurement carried out by the weight sensor 38 and the tilt measurement carried out by the tilt sensor 40. Said calculator 46 deduces therefrom a limit value of the power generated by the actuators 26 and 28 from the mapping stored in the electronic memory 52, such that during a manoeuvre of one of said actuators, the control unit 42 consequently limits the intensity of the electric current supplying said actuators.

The power-limiting means 44 thus make it possible to guarantee that the aforementioned power limit value is permanently adapted as best as possible to the corpulence of the passenger and to the tilt of the aircraft.

It should be noted that in the terminology of the invention, the calculator 46 forms both part of the measuring device, given that said calculator participates in the determination of the aforementioned reference parameter, and power-limiting means, given that said calculator participates in the calculation of the maximum power limit.

In the example represented in the figure, the weight sensor 38 is arranged so as to measure the force 43 exerted by the passenger on the seat portion 14 on account of his weight, and this force 43 is considered as being substantially proportional to the force 54 exerted by said passenger on the back rest 12 and thus to the component 48 of the weight of the passenger exerted against the actuator 26 connected to the back rest 12. The same is true as regards the leg rest 16 and its actuator 28.

According to an analogous reasoning, the weight sensor 38 may in a variant be laid out elsewhere than in the seat portion 14, for example in the back rest 12.

In addition, the control device 32 may comprise several weight sensors. The latter may then be used jointly for defining an average value representative of the weight of the passenger being exerted on the different elements of the seat 10. In a variant, these weight sensors may be used independently of each other, in which case the control unit 42 may be configured to determine the limit values of supply current of the different actuators by determining several respective reference parameters, each from the weight measurement supplied by a corresponding weight sensor.

In a further variant, the weight sensor 38 may be replaced by a force sensor directly integrated in one at least of the actuators 26 and 28, or mounted thereon, so as to measure directly the component 48 of the weight of the passenger being exerted against the actuator. In this case, the presence of a tilt sensor in the control device 32 may be superfluous.

In addition, the calculator may be configured to define the value of the aforementioned reference parameter not at regular intervals as described above but on an ad hoc basis at the start of each manoeuvre of one of the actuators 26, 28, 30. This can have an interest in terms of energy savings and computing power, especially when the aircraft equipped with the seat 10 is not likely to experience violent tilt variants, which is in general the case of civil aircraft.

Furthermore, the power-limiting means 44 may moreover by configured to also limit the supply current of the actuator 30 of the footrest 18, in the manner described above, when this has an interest.

In a variant, with the aim of simplifying the control device 32, the power-limiting means 44 may be configured to limit the supply current of the actuator 30 of the footrest 18 to a constant limit value independent of the measurements supplied by the sensors 38 and 40.

In a variant, still with the aim of simplifying the control device 32, the latter may not comprise a tilt sensor but only one or more weight sensors. Conversely, the control device 32 may not comprise a weight sensor but only a tilt sensor. In both cases, the power limit value defined by the power-limiting means risks not being optimal, even though the risk of injury or difficulty of maneuvering the seat is already considerably reduced compared to seats of the prior art.

Generally speaking, the control device 32 has been described above in its application to an aircraft seat, but said device may obviously be used advantageously in all types of vehicle, for example in automobiles, trains or ships.

In addition, the control device 32 has been described as being integrated in a seat, but a control device 32 according to the invention may be structurally independent of the seat of which it assures the control. Moreover, some of the elements of the control device 32, such as its tilt sensor 40 in particular, may be pooled and used by several control devices according to the invention assuring respectively the control of several seats.

The invention claimed is:

1. A control device for controlling at least one actuator for moving a mobile element of a seat in a vehicle, wherein said control device comprises:
    a measuring device including a tilt sensor for determining the tilt of said vehicle with respect to the horizontal direction; and
    a power-limiting means for defining a maximum limit for the power generated by said actuator depending on the tilt measured by the tilt sensor wherein the power limiting means is configured to impose a limit value of the power that can be generated by the actuator based on the defined maximum limit for the power.

2. The control device of claim 1, wherein said measuring device comprises a weight measuring means configured to provide information on a component of the weight of said passenger being exerted against said actuator.

3. The control device of claim 2, wherein said weight measuring means is associated with said actuator so as to enable a direct measurement of said component of the weight of said passenger being exerted against said actuator.

4. The control device of claim 2, wherein said weight measuring means is configured to measure a component of the weight of said passenger being exerted along a predetermined direction against a component of the seat separate from said actuator, and wherein said measuring device is configured to provide information on said component of the weight of said passenger being exerted against said actuator from the result of the measurements carried out respectively by said weight measuring means and by said tilt sensor.

5. A method for controlling an actuator for moving a mobile element of a seat in a vehicle by means of a control device according to claim 2, said method comprising:
    performing a comparison between the value of the tilt of said vehicle with respect to the horizontal direction and the information provided by said weight measurement means, and a mapping of several ranges of values for said tilt to predetermined maximum power values;
    defining a maximum limit for the power generated by said actuator in accordance with the tilt of said vehicle with respect to the horizontal direction determined by said tilt sensor of said measuring device of said control device and in accordance with the information provided by said weight measuring means of said measuring device of said control device based on the comparison; and
    imposing a limit value of the power that can be generated by the actuator based on the defined maximum limit for the power.

6. A method for controlling an actuator for moving a mobile element of a seat in a vehicle by means of a control device according to claim 1, said method comprising:
    performing a comparison between the value of the tilt of said vehicle with respect to the horizontal direction and a mapping of several ranges of values for said tilt to predetermined maximum power values;
    defining a maximum limit for the power generated by said actuator in accordance with the tilt of said vehicle with respect to the horizontal direction determined by said tilt sensor of said measuring device of said control device based on the comparison; and
    imposing a limit value of the power that can be generated by the actuator based on the defined maximum limit for the power.

7. The method according to any one of claims 6 to 5, wherein said method is repeated at regular intervals during each operation of said actuator.

8. The method according to any one of claims 6 to 5, wherein said method is carried out a single time at the start of each operation of said actuator.

9. The device according to claim 1, further comprising a seat for a vehicle, comprising:
    at least one mobile element; and
    at least one actuator for moving said mobile element.

10. The device according to claim 1 further comprising an aircraft with at least one seat comprising:
    at least one mobile element; and
    at least one actuator for moving said mobile element.

* * * * *